Feb. 10, 1942. H. W. BARDSLEY 2,272,826
SNATCH BLOCK
Filed Oct. 31, 1939
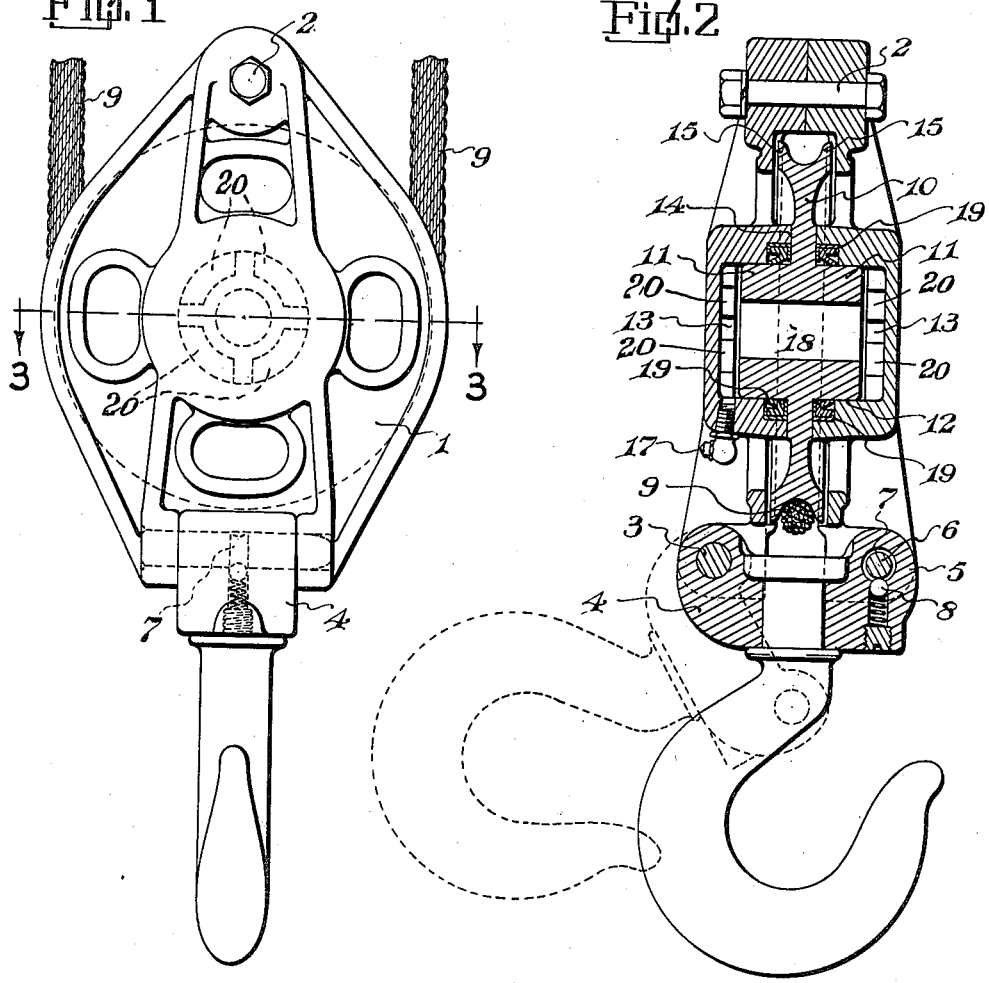
Harold W. Bardsley
INVENTOR
BY Philip A. H. Terrell
ATTORNEY Patented Feb. 10, 1942

2,272,826

UNITED STATES PATENT OFFICE 2,272,826

SNATCH BLOCK

Harold W. Bardsley, Tulsa, Okla.

Application October 31, 1939, Serial No. 302,224

1 Claim. (Cl. 254—193)

The invention relates to snatch blocks, particularly the heavy duty type and has for its object to provide a device of this character wherein the sheave is provided with relatively large hub members having bearings in chambers in the cheek plates of the block for providing bearing surfaces of large diameter, consequently a greater shearing area.

A further object is to provide the cheek plates with annular registering bearing surfaces engaging the outer faces of the sheave web for bracing said web and preventing wobbling of the sheave as it rotates.

A further object is to provide oil seal rings in the flanges engaging the web and cooperating with the sheave hubs for preventing loss of lubricant from the lubricating chambers of the cheek plate.

A further object is to provide means whereby oil may be supplied to both lubricant chambers from a single source and the hub with a passage therethrough in communication with the chambers.

A further object is to provide reinforcing ribs in spaced relation in the bottoms of the lubricant chambers.

A further object is to connect the upper ends of the cheek plates by a bolt extending transversely therethrough and the lower ends of the cheek plates by a spanner member hingedly connected to one of the plates and detachably connected to the other plate. Also to provide a swivel hook in the spanner member.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the snatch block.

Figure 2 is a vertical transverse sectional view through the snatch block.

Figure 3 is a horizontal sectional view through the snatch block taken on line 3—3 of Figure 1.

Referring to the drawing, the numeral 1 designates the cheek plates of the block and which cheek plates are connected together at their upper ends by means of a transversely disposed bolt 2. Hingedly mounted on a pin 3, carried in a bifurcation of the lower end of one of the cheek plates 1, is a spanner member 4, the free end 5 of the spanner is connected to the other cheek plate by means of the removable pin 6. The pin 6 is provided with an annular groove 7 in which is received the detent spring actuated ball 8 for holding the pin normally in position, and at the same time allowing the pin to be easily removed by a drifting tool for opening the snatch block when it is desired to place or remove the cable bight 9 therefrom.

In heavy duty snatch blocks the bearings of the sheave 10 are relatively small in area and they often wear and shear and develop a wobbling action in the sheave. To overcome this difficulty the sheave is provided with relatively large integral hubs 11 on opposite sides thereof, and which hubs have bearing engagement at 12 in the chambers 13 of the cheek plates. The cheek plates are also provided with annular flanges 14 which have ground bearing engagement with opposite sides of the sheave web and brace the same thereby preventing, in combination with the bearing surfaces 12, the development of a wobble in the sheave, so the sheave flanges 15 will rotate in true relation to the overlying flanges 16 carried by the cheek plates 1, therefore it will be seen that the cable will not be cut or worn during the rotation of the sheave, which is the common difficulty now experienced with snatch blocks.

Lubricant is furnished to one of the chambers 13 through an oil or grease fixture member 17, and the lubricant passes through the axially disposed opening 18 in the sheave hubs to the other lubricant chamber 13, therefore it will be seen that the bearings 12 will be thoroughly lubricated at all times. To prevent loss of lubricant annular oil seal rings 19 are provided around the hubs 11 and which rings engage the hubs and the web of the sheave, clearly shown in Figure 2. To insure a distribution of the lubricant and also to reinforce the walls of the chambers 13, spaced segments 20 are formed integral with the walls of the chambers. The spacing allows the oil to flow freely in the chambers and has the additional advantage of reinforcing the walls.

From the above it will be seen that a snatch block is provided which has a relatively large bearing surface thereby increasing the shearing area, which is particularly desirable for heavy duty snatch blocks, and one wherein the entrance of foreign matter, for instance water and mud, is obviated.

The invention having been set forth what is claimed as new and useful is:

A snatch block comprising cheek plates having relatively large bearing chambers therein in registration with each other, a sheave between said plates, relatively large outwardly extending hubs carried by opposite sides of said sheave and having bearings in said chambers, said cheek plates having inwardly extending annular flanges engaging opposite sides of the sheave to the outside of the hub and also engaging the peripheries of the hubs, the outer ends of the hubs terminating at points spaced from the inside surfaces of the plate chambers, thereby forming lubricant receiving means, means for supplying lubricant to one of the chambers between the hub end and the inside surface of the plate chamber, said hubs having a lubricant passage extending therethrough and connecting both chambers and lubricant baffle lugs carried by the inside surfaces of the plate chambers and to the outside of the hub ends.

HAROLD W. BARDSLEY.